April 28, 1953
L. G. SAYWELL
2,636,755
SEALING ASSEMBLY
Filed July 17, 1948
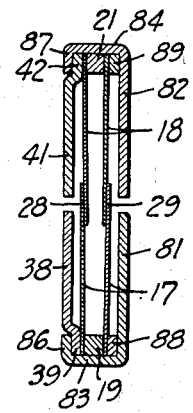
FIG_6_
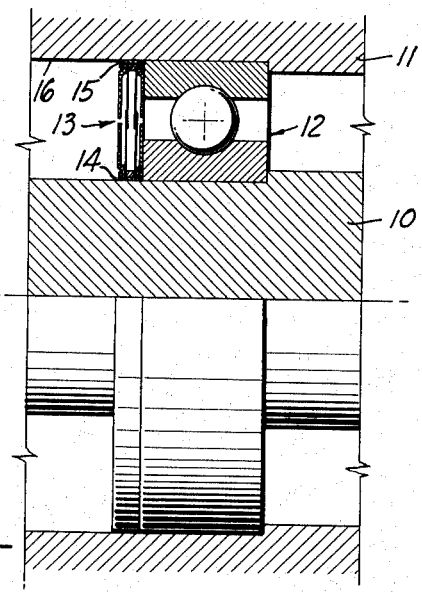
FIG_1_
FIG_2_  FIG_3_
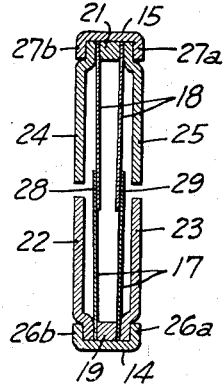 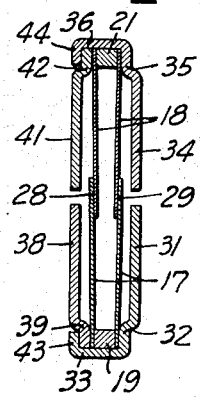
FIG_4_  FIG_5_
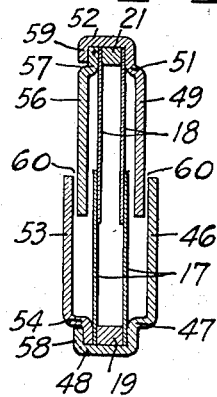 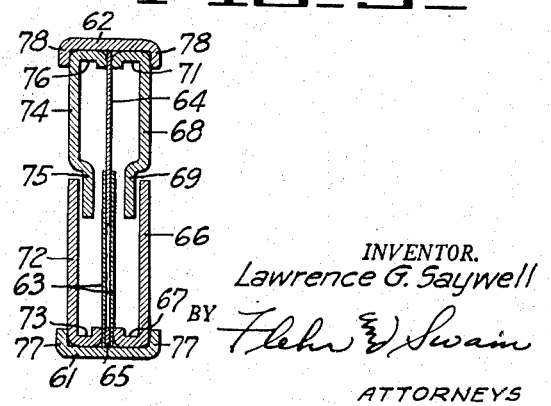
INVENTOR.
Lawrence G. Saywell
BY
ATTORNEYS Patented Apr. 28, 1953

2,636,755

UNITED STATES PATENT OFFICE 2,636,755

SEALING ASSEMBLY

Lawrence G. Saywell, San Mateo, Calif., assignor to Saywell Associates, a joint venture comprising Guy F. Atkinson Company, a corporation of Nevada, George H. Atkinson and Lawrence G. Saywell, both of San Mateo, Calif.

Application July 17, 1948, Serial No. 39,245

5 Claims. (Cl. 286—11)

This invention relates generally to devices adapted to form a seal between inner and outer concentric parts. Such devices are particularly applicable to seal against leakage of lubricant from shaft bearings.

In my Patent No. 2,428,041, filed September 26, 1945, there is disclosed a sealing device comprising inner and outer structures having members in overlapping relation on annular sealing areas. Certain of the members of the device are formed of relatively thin spring metal stressed or sprung to maintain the overlapping portions in sealing engagement.

A device of this character is subject to injury or breakage to destroy its usefulness as a lubricant seal. Injury may occur during installation, as by stressing the thin sheet metal members beyond their elastic limits, or by accidental mutilation or breakage of the members of the device during use.

It is an object of the present invention to provide a sealing device of the type disclosed in my said Patent No. 2,428,041, but which will be adequately protected against accidental injury or breakage.

A further object of the invention is to provide a device of the above character which will afford protection against injury due to excessive axial movement between the outer and inner structures.

Another object of the invention is to provide a device of the above character which can be readily manufactured, and which will incorporate protective elements integral with other parts of the assembly.

Further objects of the invention will appear from the following description in which the preferred embodiments of the invention have been disclosed in detail in conjunction with the accompanying drawing.

Referring to the drawing:

Figure 1 is a side elevational view, partly in section, illustrating a shaft bearing having one of my devices installed in connection with the same.

Figure 2 is an enlarged cross-sectional detail illustrating one embodiment of the invention.

Figure 3 is a view like Figure 2 but showing another embodiment of the invention.

Figure 4 is a view like Figure 2 but showing a third embodiment of the invention.

Figure 5 is a view like Figure 2 and showing a fourth embodiment of the invention.

Figure 6 is a view like Figure 2 and showing a fifth embodiment of the invention.

Figure 1 illustrates a conventional shaft 10 disposed concentric with respect to the outer part or housing 11. A roller or ball bearing assembly 12 serves to journal the shaft with respect to the housing. One of my devices, indicated generally at 13, is installed adjacent the ball bearing assembly 12, for the purpose of preventing loss or leakage of lubricant.

Referring to the embodiment of Figure 2, the device comprises inner and outer structures including the inner and outer mounting rings 14 and 15. Ring 14 is adapted to have a fluid tight fit upon the shaft 10, and ring 15 is proportioned to have a fluid tight fit within the bore 16 of the housing 11.

Mounting ring 14 serves to mount the annuluses 17, which are preferably formed of relatively thin sheet metal such as high carbon spring steel, or suitable alloys such as Phosphor bronze, stainless steel and the like. For devices suitable for application to shafts of the more common sizes, it is satisfactory to form the annuluses of spring steel having a thickness of the order of 0.003 inch. Annuluses 17 are in overlapping relationship with and cooperate with a pair of similar annuluses 18, carried by the outer mounting ring 15. A predetermined spacing is maintained between the annuluses 17 and 18 by means of the spacer rings 19 and 21. The spacing is such that the annuluses are normally stressed laterally within their elastic limits, whereby their overlapping portions are urged together into sealing engagement.

In addition to the annuluses just described, guard annuluses 22, 23, 24 and 25 are provided. These annuluses are relatively rigid and strong compared to the annuluses 17 and 18, and may for example be formed of steel having a thickness of the order of 0.03 inch. It will be noted that one inner and one outer annulus is assembled against the flanges 26a and 27a provided on the mounting rings 14 and 15. The other guard annuluses are held in place by the flanges 26b and 27b, thus serving to firmly clamp and hold the annuluses 17 and 18 in the complete assembly.

The guard annuluses are proportioned whereby the outer edges of the annuluses 22 and 23 are adjacent to but radially spaced from the inner edges of the annuluses 24 and 25. Also the guard annuluses are shaped whereby except for the peripheral edges of the same (which maintain clamping engagement with the annuluses 17 and 18) they are spaced from the annuluses 17 and 18 whereby there is no interference with the desired lateral flexing movement.

It will be noted that in this instance the annular region of proximity between the guard annuluses is on a diameter corresponding generally to the mean diameter of the overlap between the spring metal annuluses.

The device illustrated in Figure 2 is shown installed with the bearing of Figure 1. When the device is being installed there is little if any danger of causing injury to the device, due to the protection afforded by the rigid guard annuluses 22 to 25. When finally installed, with the mounting rings 14 and 15 in abutting relation with the races for the ball bearing 12, the overlapping portions of the annuluses 17 and 18 form an effective seal against leakage of lubricant. As previously explained the stressing or loading serves to maintain pressure between the overlapping sealing areas 28 and 29, thus maintaining the desired seal. The radial spacing between the guard annuluses 22, 23, and 24, 25 accommodates a certain amount of radial misalignment, the same as if such guards were not present. In addition the shaft and the inner structure including the annuluses 17 may move longitudinally of the shaft axis a limited amount, without causing separation between the sealing areas 28, 29, and without such motion being interfered with by the guard annuluses. During use of the device the guard annuluses serve to protect the more fragile annuluses 17 and 18 from accidental mutilation or breakage. The guard annuluses are capable of withstanding relatively severe impacts and forces which would otherwise cause serious mutilation or breakage of the annuluses 17 and 18.

In the embodiment described above the guard annuluses 22 to 25 serve to provide clamping members to retain the annuluses 17 and 18 in proper position. In the embodiment of Figure 3 one inner and one outer annulus is also formed to provide the inner and outer mounting rings. Thus in this instance the inner and outer annuluses 17 and 18 are the same as in Figure 2, and they are likewise associated with the spacer rings 19 and 21. Instead of a separate mounting ring as in Figure 2, in Figure 3 the one guard annulus 31 is formed with an integral offset portion 32, and an integral rim 33. Guard annulus 34 is similarly formed with an offset portion 35 and a rim 36.

The rims 33 and 36 of Figure 3 serve the same purpose as the separate mounting rings 14 and 15 of Figure 2, that is to accommodate the annuluses 17 and 18 and the spacer rings 19 and 21. Guard annulus 38 is formed with an offset portion 39 proportioned to fit within the rim 33. Guard annulus 41 has a similar offset portion 42, proportioned to fit within the rim 36. The assemblies on the rims 33, 36 are held clamped together by the turned over edges or flanges 43, 44.

In the embodiment of Figure 4 the guard annuluses are arranged to limit relative axial movement between the outer and inner structures. In this instance the inner and outer annuluses 17 and 18 are again formed in the same manner as in Figures 2 and 3, and are assembled together with the spacer rings 19 and 21. Guard annulus 46 is formed similar to the guard annulus 31 of Figure 3, in that it has an offset portion 47 and the rim 48. The outer guard annulus 49 likewise has the offset 51 and a rim 52. Guard annulus 53 has the offset margin 54 fitted within the rim 48, and annulus 56 has an offset margin 57 fitted within the rim 52. The rims 48, 52 have the turned over edge portions or flanges 58, 59.

In the arrangement of Figure 4, in place of having the inner and outer annuluses radially spaced, they are in overlapping relation. The normal clearance or spacing 60 between the overlapping portions of the guard annuluses is equal to twice the desired permissible movement in a direction axially of the shaft.

In installing the device of Figure 4 it is impossible to cause injury or breakage to the annuluses 17 and 18, by causing too much axial displacement of the inner and outer structures. Any such displacement is necessarily limited by the spacing 60. After being installed the proper normal position of the parts is substantially as shown in Figure 4. Thus a substantial clearance is maintained between the overlapping portions of the guard annuluses, to avoid wear or friction. However, considerable movement of the shaft may occur in a direction longitudinally of its axis, without bringing the guard annuluses into direct rubbing contact. In addition there is no interference to radial movement between the inner and outer structures, such as occurs when there is a slight misalignment.

The embodiment of Figure 5 is similar to Figure 4 in that it likewise limits displacement between the inner and outer structures in a direction longitudinally of the shaft axis. However, in this instance there is likewise a limitation with respect to displacement in a radial direction. In this instance cylindrical inner and outer mounting rings 61 and 62 are provided. The inner resilient annuluses 63, which are carried by mounting ring 61, are in overlapping sealing engagement with the single resilient annulus 64. The inner peripheral edges of the annuluses 63 are separated by the spacer 65, and the loading of annuluses 63 can be accomplished by the proportioning of the spacer 65, or by providing a dished form for the annuluses 62, before the same are assembled. The guard annulus 66 has an inturned portion 67 serving to fit within the mounting ring 61, and to provide means for clamping against the inner peripheral edge of the adjacent annulus 63. A cooperating guard annulus 68 has an offset portion 69 in spaced overlapping relation with annulus 66. Likewise guard annulus 68 has an inturned portion 71 fitting within the mounting ring 62, and serving as a clamping shoulder for the outer peripheral edge portion of annulus 64. The guard annulus 72 is formed in the same manner as annulus 66, in that it has an inturned portion 73 tightly fitting upon the mounting ring 61. Guard annulus 74 is similar to annulus 68 in that it has the offset portion 75 and the inturned portion 76. Mounting rings 61, 62 have turned over edges or flanges 77, 78 to clamp and retain the associated parts.

With the parts assembled as in Figure 5, it will be evident that the guard annuluses limit movement between the outer and inner structures in a direction longitudinally of the axis. At the same time radial movement between the inner and outer structures is limited, thus maintaining general alignment in the manufacture of the assembly, and precluding radial misalignment beyond permissible limits.

The embodiment of Figure 6 is similar to Figure 3. However, the guard annuluses 81, 82 are formed without the offsets 32, 35, but instead are simply formed to provide the rims 83, 84, and the turned over flanges 86, 87 (formed at the time of final assembly). Spacer rings 88, 89 serve the same purpose as the offsets 32, 35.

I claim:

1. In a sealing device of the type adapted to be installed in an annular recess between outer and inner concentric parts to provide a fluid tight seal, outer and inner structures adapted to be disposed in fluid tight relationship with the outer and inner parts, one structure including a mounting ring and a thin spring metal annulus carried by the mounting ring, the other structure providing a mounting ring and an annular surface having overlapping sealing engagement with the margin of the annulus, two relatively rigid guard annuluses carried by each of said mounting rings and disposed to extend over the faces of said spring metal annulus, said guard annuluses having their free margins in relatively close proximity but spaced from direct engagement.

2. A device adapted to be disposed in an annular space between outer and inner concentric parts comprising outer and inner structures adapted to be disposed in fluid tight relationship with the outer and inner parts, each of said structures comprising a mounting ring and at least one thin spring metal annulus carried by the ring, the annuluses of the two structures being in overlapping and sealing engagement, and two rigid guard annuluses carried by each of said mounting rings and extending parallel to and over the faces of said first named annuluses, said guard annuluses having peripheral edge portions of the same in close proximity but spaced from direct engagement.

3. In a device adapted to be installed in an annular space between outer and inner concentric parts to provide a seal, outer and inner structures adapted to be disposed in fluid tight relationship with the outer and inner parts, each structure comprising a mounting ring and a thin spring metal annulus carried by the mounting ring, peripheral edge portions of the spring metal annuluses being in overlapping and sealing engagement, and two relatively rigid guard annuluses carried by each of said mounting rings and extending parallel to and over the faces of said first named annuluses, the two outer guard annuluses being spaced from the adjacent outer resilient annuluses and the two inner guard annuluses being spaced from the inner resilient annuluses and also having spaced overlapping relationship with the inner peripheral edge portions of the outer guard annuluses.

4. A device as in claim 3 in which one of the outer guard annuluses is formed integral with the outer mounting ring and the other outer guard annulus is formed to have a press fit within the outer mounting ring and to clamp against the outer resilient annuluses, and in which one of the inner guard annuluses is formed as an integral part of the inner mounting ring, and the other inner guard annulus is formed to have a press fit within the inner mounting ring, thereby to serve as clamping means for the inner resilient annuluses.

5. A device as in claim 2 in which the annular region of proximity between said guard annuluses is on a diameter corresponding generally to the mean diameter of the overlap between said spring metal annuluses.

LAWRENCE G. SAYWELL.

References Cited in the file of this patent

UNITED STATES PATENTS

| Number | Name | Date |
|---|---|---|
| 2,000,341 | Larsh | May 7, 1935 |
| 2,240,252 | Bernstein | Apr. 29, 1941 |
| 2,275,996 | Searles | Mar. 10, 1942 |
| 2,322,834 | Dornhofer | June 29, 1943 |
| 2,404,610 | Abell | July 23, 1946 |
| 2,428,041 | Saywell | Sept. 30, 1947 |